United States Patent [19]

Persson

[11] 4,095,734
[45] Jun. 20, 1978

[54] METAL WALL PROVIDED WITH EITHER EXTERNAL OR INTERNAL CLADDING

[75] Inventor: Per Ingemar Persson, Nora, Sweden
[73] Assignee: Nitro Nobel AB, Gyttorp, Sweden
[21] Appl. No.: 662,152
[22] Filed: Feb. 27, 1976
[30] Foreign Application Priority Data
      Mar. 10, 1975   Sweden .............................. 7502619
[51] Int. Cl.² ...................... B23K 21/00; B23K 31/02
[52] U.S. Cl. .................................... 228/104; 220/470;
                                                      228/107; 228/184
[58] Field of Search ............................... 228/107–109,
              228/103–104, 2.5, 178, 184; 220/63 R; 73/46

[56] References Cited
U.S. PATENT DOCUMENTS

| | | | |
|---|---|---|---|
| 1,977,987 | 10/1934 | Corby | 228/104 |
| 2,772,860 | 12/1956 | Nelson | 220/63 R X |
| 2,818,995 | 1/1958 | Duguid | 220/63 R |
| 3,344,510 | 10/1967 | Kameishi et al. | 228/107 |
| 3,813,002 | 5/1974 | Gurklis | 220/63 R |

FOREIGN PATENT DOCUMENTS 455,595   10/1936   United Kingdom .............. 220/63 R Primary Examiner—Donald G. Kelly
Assistant Examiner—K. J. Ramsey
Attorney, Agent, or Firm—Hane, Roberts, Spiecens & Cohen

[57] ABSTRACT

A metal wall, such as that of a vessel, is provided with cladding which is welded to the metal wall such that an elongated space is formed between the weld seams. The elongated space allows for the testing of the weld seams for leakproofness by closing off one end of the space and injecting a gaseous medium, or the like, into the space and gauging whether or not the medium exits via the weld seams. A plate made of rubber, plastic or the like may also be used in welding the cladding to the metal wall, which plate covers the unconnected ends of the two cladding parts making up the cladding layer for the metal wall.

9 Claims, 15 Drawing Figures

METAL WALL PROVIDED WITH EITHER EXTERNAL OR INTERNAL CLADDING

BACKGROUND OF THE INVENTION

The present invention relates to a metal wall of, for example, a vessel which is provided with either external or internal cladding. It is a common practice to make a metal wall of unalloyed material and then clad the wall with a thin cladding of alloyed material, e.g. titanium, tantalum, copper, stainless steel, aluminium, and other alloys. By having a thin layer of cladding applied to an unalloyed material, a cheaper product is obtained than if the product were made entirely of an alloy. However, there are certain difficulties involved in fastening the cladding and in joining the cladding so that it forms a leakproof layer. As a rule, highly skilled personnel are required to carry out the fastening of the cladding to the metal wall. It is, of course, possible to use weld seams, obtained either by means of electric welding or gas welding, or by means of explosive welding. However, it has been proved that difficulties arise afterwards, when the tightness of the weld is to be tested. If, for instance, a cladding has been applied to a metal vessel internally, the cladding can not be subjected to a pressure that is too high, without the vessel being damaged.

SUMMARY OF THE INVENTION

An object of the present invention is to create a simple joining of two ends of a cladding, of such a nature that it is guaranteed that the joint is leakproof. This is accomplished by two ends of cladding being joined together with the aid of two connecting seams, such as joints made by means of welding with gas or electricity and by explosion welding. If two ends of the metal cladding overlap each other, the overlapping zone is clad at the peripheries with two connecting seams. The two overlapping ends and the connecting seams form a longitudinal space, which can be closed at one end and a medium fed to it from the other end, for testing of leakproofness. An example of such a medium is a gas, for instance helium. If there is a pressure drop, one of the connecting seams is not leakproof.

Two ends of the cladding can be placed edge to edge, and the meeting edges welded together. Thereafter, a metal strip is placed along the weld seam, and at the periphery of the metal strip two connecting seams are made, which join the metal strip to the two ends of the cladding, with a longitudinal space being formed between the two connecting seams and the under side of the metal strip and the underlying parts of the cladding wall.

The weld mentioned in the foregoing can be omitted. In such a case, a connecting seam is applied on either side of the previously mentioned connecting seams, which connecting seams join the cladding wall to the underlying wall, a longitudinal space then being formed between the last-mentioned connecting seams, which has the wall base as one wall and the cladding above it with the closing metal strip forming the opposite wall.

If explosion welding is used for achieving connecting seams, it is appropriate to use elongate cords or strips, for example, plastic, plaster, rubber or the like, containing a ribbon explosive of, for instance, penthrite, RDX, TNT, or some other explosive, which explosive charge in a known way is initiated by means of, for instance, a detonator.

The above-mentioned strips or cords for the explosive can have such a form that together they form a rectangular plate, or else they can be placed on a connecting plate or have a plate forming a bridge member to hold them together.

The strips or cords for the explosive charges can also consist of hoses filled with explosive. Segments can then appropriately be ground off from the hoses, so that these can more easily be applied to the cladding wall.

The hoses can also contain fuses, and between the fuses explosive charges can be applied so that joining can be obtained. The hoses can, moreover, be provided with means that propagate shock waves. Uniformly spaced between the hoses, explosive can be applied, which is initiated by the shock wave, and in cases when this is not sufficient, amplification means can be arranged in a known way.

BRIEF DESCRIPTION OF THE DRAWING

The present invention will be described in more detail with reference to the accompanying five figures, in which.

DETAILED DESCRIPTION OF THE INVENTION

Figure 1:
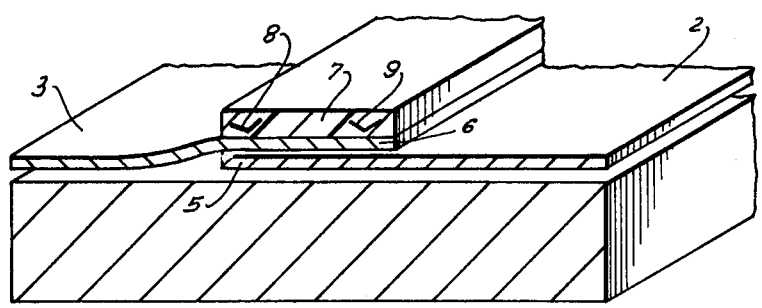
FIG. 1 shows a base plate provided with a cladding wall with two overlapping end parts where a plate with two strips of explosive is placed on the overlapping section.
Figure 2:
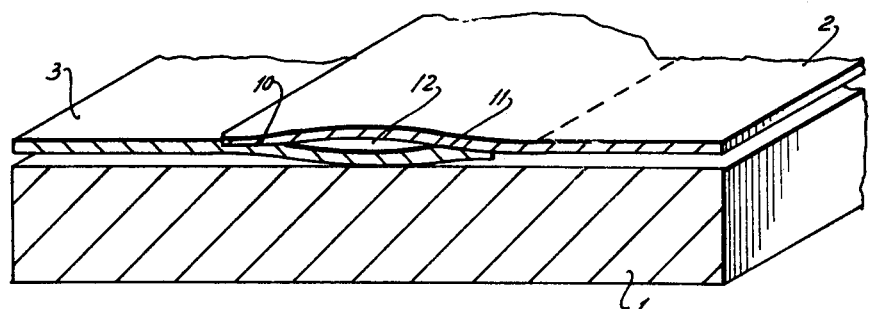
FIG. 2 shows how said two overlapping parts are joined together.

In FIG. 1, a base plate is shown, which can appropriately consist of a wall of a vessel and can be made of any suitable kind of material whatsoever, for instance cast iron, but preferably an unalloyed material. On the inside of the vessel, two cladding plates 2 and 3 have been applied. These plates can be of, for example, titanium, tantalum, copper, stainless steel, aluminium, or any other suitable alloy. The cladding plates 2 and 3 have two overlapping parts 5 and 6, which are to be joined together. Along the overlapping parts a plate 7 with a rectangular cross section has been placed. This plate can consist of plastic, plaster, rubber, or any other suitable material, and the plate contains two parallel explosive charges 8 and 9 of, for example, penthrite, RDX, TNT, or some similar material. The two explosive charges can be initiated in any known way whatsoever, for instance by means of a detonator. If the two strips of explosive charge in FIG. 1 are initiated, a joint is obtained along the overlapping section in the form of two weld seams 10 and 11. Between the weld seams a cavity 12 will arise. This cavity can be closed at one end and tested for leakproofness, and it will then immediately be found whether or not there is any leak, and also where such a leak is located. Through the present invention, an arrangement has thus been obtained according to which it is possible to pressure test a vessel without having to subject the entire vessel to a pressure, but only the joints. A method which is considerably cheaper than would otherwise have been the case has thereby been achieved for carrying out pressure testing.

Figure 3:
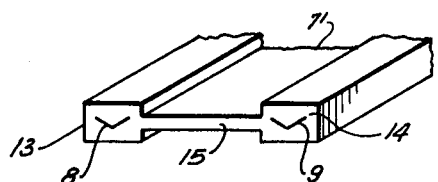
FIGS. 3 – 7 show how two different strips of explosive can be joined together to form one coherent unit.
Figure 4:
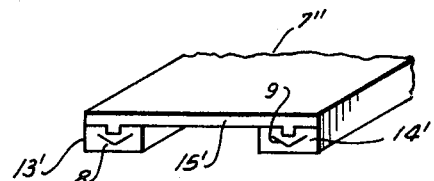
Figure 5:
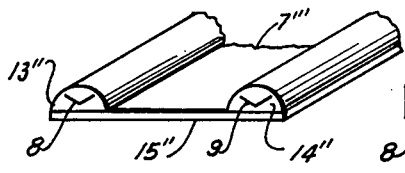
Figure 6:
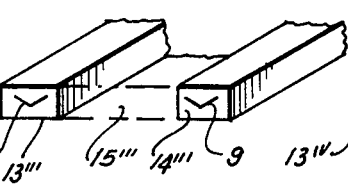
Figure 7:
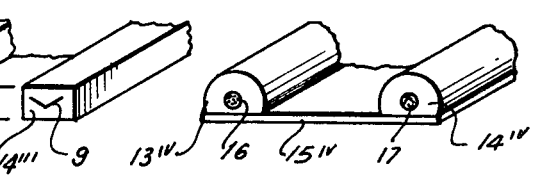
Figure 9:
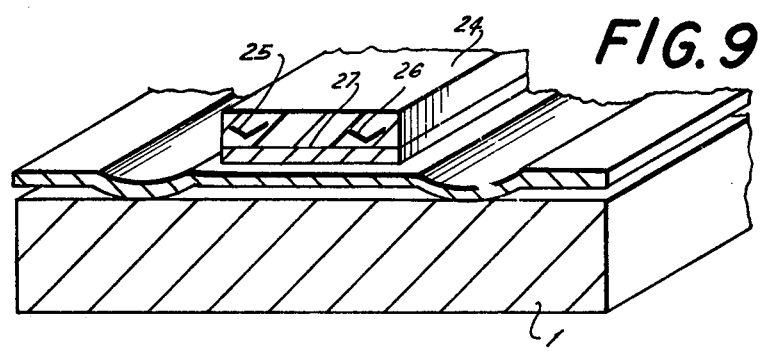
FIG. 9 shows the same cladding wall with meeting edges, above which edges a metal band with a plate containing two strips of explosive is placed.
Figure 10:
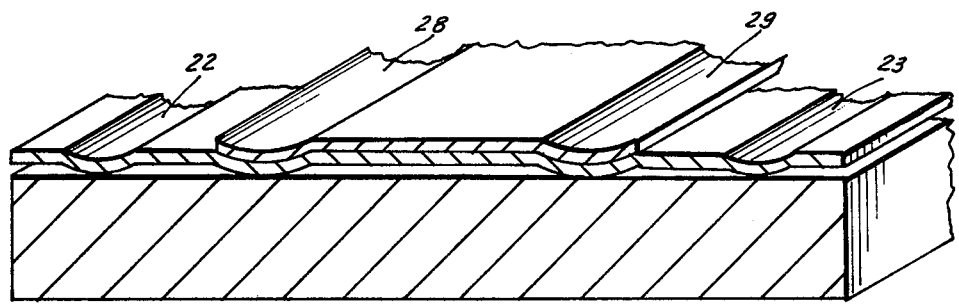
FIG. 10 shows the connecting seams which are obtained with the aid of the explosive charges according to FIG. 8 and FIG. 9.
Figure 11:
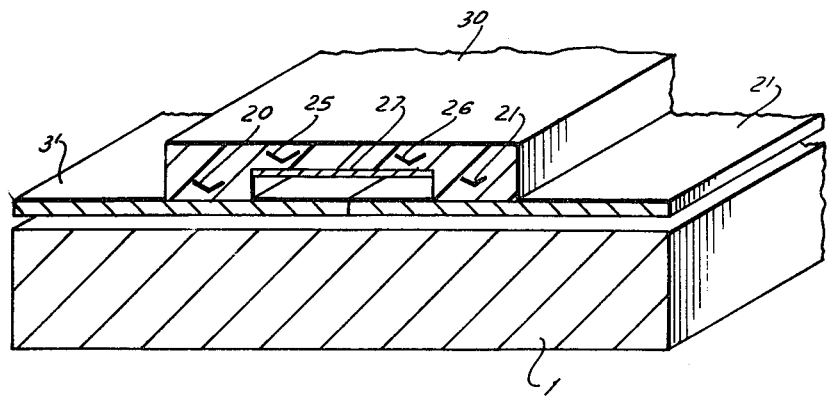
FIG. 11 shows the same base wall and the same cladding wall as in FIG. 8 but on the cladding wall a plate has been placed along the meeting edges, which is provided with two strips of explosive charge. In the plate, between the strips of explosive charge, a groove is arranged. In the bottom of the groove a metal plate is arranged, and under the bottom of the groove two strips of explosive charge are arranged.

FIGS. 3 – 7 show strips or bands of the same material as that in the plate 7, which strips contain the same explosive charges as the plate 7. The two strips 13-14, 13'-14', 13''-14'', 13'''-14''', or 13$^{iv}$-14$^{iv}$ are either held together by means of a bridge member 15,15''', as shown in FIGS. 3 and 6, or arranged on a plate 15', 15'' as shown in FIG. 4. Further, the strips can have the nature of tubes, for instance of plastic or rubber, as shown in FIG. 7, and on which tubes a circle segment has been ground off, whereby the tubes have obtained a longitudinal flat surface, with the aid of which the tubes are laid on a flat surface or plate 15$^{IV}$ and then possibly fastened thereto with the aid of some adhesive means. The tubes 13$^{IV}$ and 14$^{IV}$ are filled with explosive charges 16 and 17. FIG. 8 again shows a base plate 1 and two cladding plates 2' and 3', the free edges of which can be in contact with each other. Along the free edges, a longitudinal plate 19 is placed, which can be of the same material as the plate 7. The plate is provided with two parallel strips of explosive charge 20 and 21. These explosive charges 20 and 21 are initiated, and two weld seams 22 and 23 are then obtained, as shown in FIG. 10. After the two last-mentioned weld seams have been made, a new plate 24, of the same kind as the one in FIG. 7, is applied. This plate has two longitudinal strips of explosive charges 25 and 26. On the under side of the plate, a metal band is applied. If now said strips of exposive charge 25 and 26 are initiated, two weld seams 28 and 29 are obtained between the metal band 27 and the cladding plate 2' and 3'. Through the four weld seams 22 and 23, 28 and 29, a longitudinal space 12' is formed, which can be closed at one end, and with the aid of which the leakproofness of the weld seams made can be tested. FIG. 11 shows a single plate 30, of the same material as the plate 7, and which contains no less than four strips of explosive charges 20, 21, 25 and 26 and which moreover has a machined recess containing the metal band 27. With the plate 30, exactly the same connecting seams can be achieved as those obtained with the aid of the two plates according to FIGS. 8 and 9.

Figure 8:
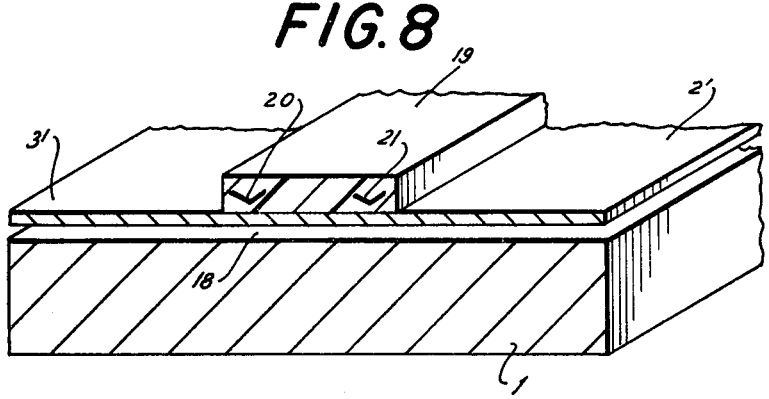
FIG. 8 shows two parts of a cladding wall, where two end edges are in contact with each other and where said meeting edges are covered with a band containing two strips of explosive.
Figure 12:
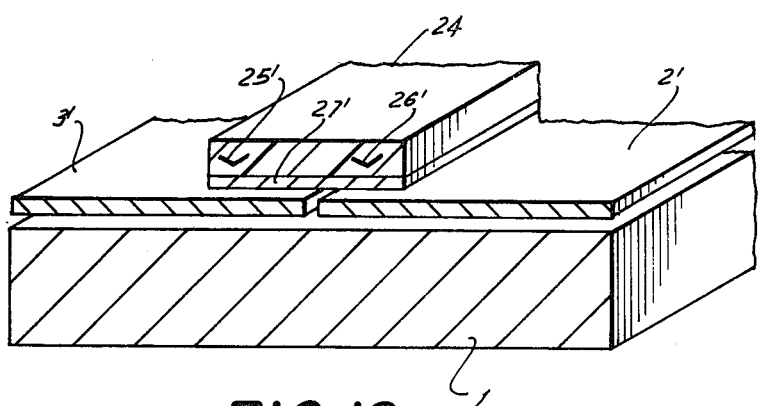
FIG. 12 shows a base and a cladding wall where two end edges meet and where, above the cladding wall and above the meeting edges, a metal plate is placed, which is provided with a plate containing two strips of explosive charge.
Figure 13:
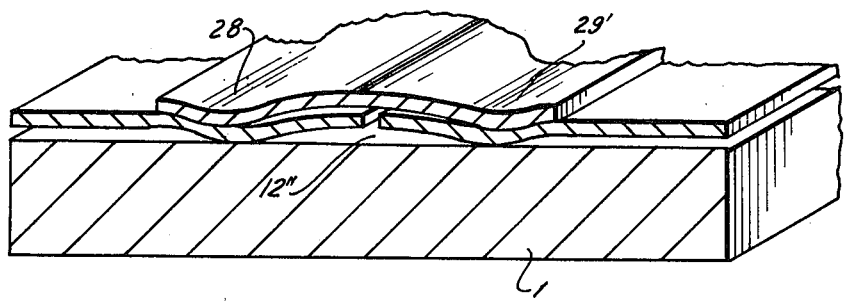
FIG. 13 shows said metal plate welded to the cladding wall and to the base.

FIG. 12 shows the same base plate as the one in FIG. 8, and also the same cladding plates as those in FIG. 8. According to this figure, there is also arranged an elongated plate 24' of the same material as the plate 7. The plate is moreover provided with two longitudinal strips of explosive charge 25' and 26', and on its under side it is provided with a metal band 27'. In this case, the explosive charges have such properties that at the initiation not only the metal band 27' is joined to the underlying cladding plates 2' and 3' but a joint is also obtained with the underlying base plate 1. The connecting seams are clearly shown in FIG. 13, and the seams have been given the reference designations 28' and 29'. Also in this case, a longitudinal space 12'' is obtained.

Figure 14:
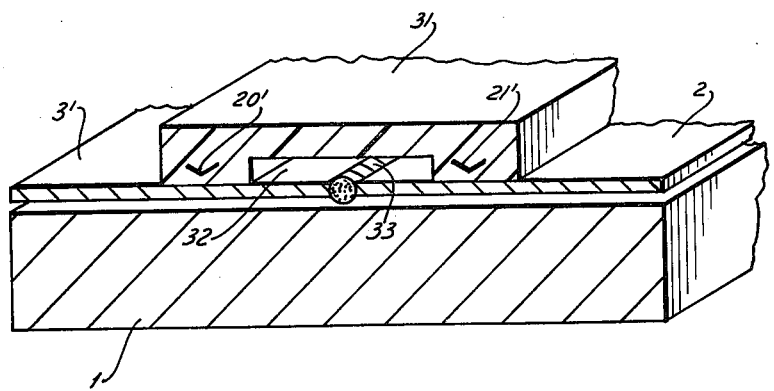
FIG. 14 shows a base and a cladding wall, the meeting edges of which have been welded together and where, above the weld, a longitudinal plate has been applied containing two strips of explosive charge along its edges.
Figure 15:
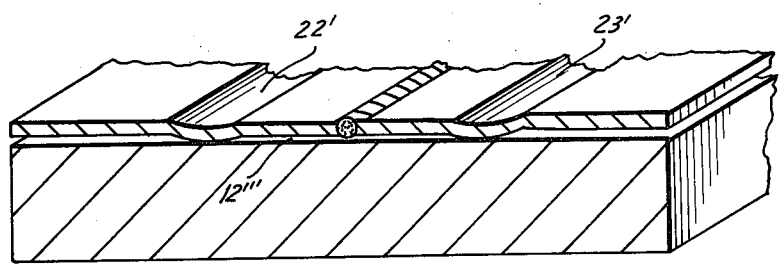
FIG. 15 shows the cladding wall of FIG. 14 welded to the base on both sides of said weld.

FIG. 14 shows a base plate 1 and two cladding plates 3' and 2' with meeting edges as in FIG. 8. The meeting edges are joined together with a weld 33. On the cladding plates 2' and 3' a plate 31 is placed which is provided with a machined recess 32. On either side of the recess two strips of explosive charge 20' and 21' are arranged. If these two explosive charges 20' and 21' are initiated, two connecting seams 22' and 23' are obtained between the cladding plates 2' and 3' and the base plate 1. Between said connecting seams, the base plate 1, and the cladding playtes 2' and 3', a longitudinal space 12'' is obtained, which can be utilized for testing the leakproofness of the connections made.

In the foregoing, it has been described how line joints are achieved, and then in conjunction with the forming of a space between two line joints. However, it should be obvious that the method described for achieving line joints can also be utilized in cases when spaces are not required.

The previously mentioned hose can be filled with explosive, or else a fuse can be inserted, for instance a detonating cord. The explosive which is inserted in the hose can be of different strength along the hose. Thus, a certain part can have a weak explosive, a following part a strong explosive, thereafter a part with a weak explosive etc. The fuse which is inserted can also have such properties that along its extent it has points with a reinforced explosive effect. It is also possible to insert fuse parts of different strength in the hollow space.

If now a hose with explosive and two metal objects, which are to be joined together, are placed as above, and the explosive is initiated in one end of the hose, a detonation wave will be developed along the hose. At the same time as the detonation wave moves along, radial pressure forces are developed. Line joining is then obtained along the hose, and then on both sides of it. Each line joint is formed by radial forces within an angular sector counted from the centre of the hose, the centre point line of which forms an oblique angle to the surfaces of the materials which are to be joined together. The outer limiting lines of each sector also form oblique angles to said surfaces. The explosive in the hose and the thickness of the hose should be chosen in such a way that the pressure force which is obtained is sufficient for explosion welding. If, as previously mentioned, different fuses are used along a hose, or if the quantities of explosive are varied, an intermittently welded joint is obtained, which can consist of spot welds.

It should be obvious that two or more hoses can be placed parallel to each other and can be provided with connecting members so that they together form one single coherent unit.

I claim:

1. An improvement in a metal wall of a vessel, provided with a cladding layer having a first cladding part with a first end and a second cladding part with a second end in close proximity to said first end of said first cladding part, said first end of said first cladding part overlapping said second end of said second cladding part, wherein the improvement comprises a first weld seam joining said first and second cladding parts together at said first end of said first cladding part, and a second weld seam substantially parallel to said first weld seam spaced from said first weld seam along said first and second cladding parts joining together said first and second cladding parts at said second end of said second cladding part, said first and second weld seams forming therebetween an elongated chamber-like space which may be used for testing the leakproofness of said first and second weld seams with a fluid medium.

2. An improvement in a metal wall of a vessel, provided with a cladding layer having a first cladding part with a first end and a second cladding part with a second end in close proximity to said first end of said first cladding part, said first end of said first cladding part abutting directly against said second end of said second cladding part, wherein the improvement comprises a first weld seam connecting said first cladding part to said metal wall, said first weld seam being spaced from said first end of said first cladding part in a direction away from said second end of said second cladding part, and a second weld seam connecting said second cladding part to said metal wall, said second weld seam being spaced from said second end of said second cladding part in a direction away from said first end of said first cladding part, said first and second weld seams forming therebetween an elongated chamber-like space defined by said first and second cladding parts and said metal wall which may be used to test the leakproofness of said first and second weld seams with a fluid medium.

3. The improvement according to claim 2, further comprising a plate overlapping said first and second ends of said first and second cladding parts, respectively, said plate having a first end portion lying above a portion of said first cladding part, and a second end portion lying above a portion of said second cladding part, and a third weld seam connecting said first end portion of said plate to said portion of said first cladding part lying below said first end portion and connecting said portion underlying said first end portion to said metal wall, and a fourth weld seam connecting said second end portion of said plate to said portion of said second cladding part lying below said second end portion and connecting said portion underlying said second end portion to said metal wall, said third and fourth weld seams forming therebetween an elongated chamber-like space defined between said first and second cladding parts and said metal wall which may be used to test the leakproofness of said third and fourth weld seams with a fluid medium, said third and fourth weld seams lying within said first and second weld seams.

4. The improvement according to claim 2, further comprising a plate overlapping said first and second ends of said first and second cladding parts, respectively, said plate having a first end portion lying above a portion of said first cladding part containing therein said first end thereof, and a second end portion lying above a portion of said second cladding part containing therein said second end thereof, said first weld seam connecting said first end portion of said metal plate to said portion of said first cladding part lying therebelow in addition to connecting said first cladding part to said metal wall, and said second weld seam connecting said second end portion of said metal plate to said portion of said second cladding part lying therebelow in addition to connecting said second cladding part to said metal wall.

5. The improvement according to claim 2, wherein said first ends of said first and second cladding parts are welded together.

6. In a method of fastening cladding to a metal wall and testing the fastening, which cladding has a first cladding part having a first end and a second cladding part having a second end in close proximity to the first end of said first cladding part, each of said first and second cladding parts being connected to at least one of the other one of said cladding parts and said metal wall by at least a first weld seam and a second weld seam, the improvement comprising: forming an elongated chamber-like space between said first weld seam and said second weld seam, closing off said elongated chamber-like space at one end, and injecting a testing medium into the open end of said chamber-like space for indicating the leakproofness of said first weld seam and said second weld seam, said step of forming an elongated chamber-like space comprising overlapping said first end of said first cladding part over said second end of said second cladding part, welding said first end of said first cladding part to that portion of said second cladding part therebelow, and welding said second end of said second cladding part to that portion of said first cladding part thereabove.

7. In a method of fastening cladding to a metal wall and testing the fastening, which cladding has a first cladding part having a first end and a second cladding part having a second end in close proximity to the first end of said cladding part, each of said first and second cladding parts being connected to at least one of the other one of said cladding parts and said metal wall by at least a first weld seam and a second weld seam, the improvement comprising: forming an elongated chamber-like space between said first weld seam and said second weld seam, closing off said elongated chamber-like space at one end, and injecting a testing medium into the open end of said chamber-like space for indicating the leakproofness of said first weld seam and said second weld seam, said step of forming an elongated chamber-like space comprising abutting said first and second ends of said first and second cladding parts, respectively, against one another, and welding a portion of said first cladding part remote from said first end thereof in a direction away from said second end of said second cladding part to said metal wall therebelow, which thereby forms said first weld seam, and welding a portion of said second cladding part remote from said first end thereof in a direction away from said first end of said first cladding part to said metal wall therebelow, which thereby forms said second weld seam.

8. The method according to claim 4, wherein said step of forming an elongated chamber-like space further comprises covering said first and second ends of said first and second cladding parts, respectively, with a plate, and said steps of welding comprise welding said plate to said portions of said first and second cladding parts welded to said metal wall therebelow.

9. The method according to claim 4, wherein said step of abutting said first and second ends of said first and second cladding parts, respectively, comprises welding said first ends together.

* * * * *